US012096781B2

(12) United States Patent
Cheison et al.

(10) Patent No.: US 12,096,781 B2
(45) Date of Patent: Sep. 24, 2024

(54) PET FOOD PRODUCT

(71) Applicant: Mars, Incorporated, McLean, VA (US)

(72) Inventors: Seronei Chelulei Cheison, Langwedel (DE); Elvia Luigina Murgueytio Riofrio, Tostedt (DE)

(73) Assignee: Mars, Incorporated, McLean, VA (US)

( * ) Notice: Subject to any disclaimer, the term of this patent is extended or adjusted under 35 U.S.C. 154(b) by 670 days.

(21) Appl. No.: 16/638,399

(22) PCT Filed: Aug. 16, 2018

(86) PCT No.: PCT/US2018/000237
§ 371 (c)(1),
(2) Date: Feb. 11, 2020

(87) PCT Pub. No.: WO2019/035962
PCT Pub. Date: Feb. 21, 2019

(65) Prior Publication Data
US 2020/0205441 A1    Jul. 2, 2020

(30) Foreign Application Priority Data

Aug. 16, 2017   (GB) ...................................... 1713155

(51) Int. Cl.
*A23K 10/28*   (2016.01)
*A23J 3/08*    (2006.01)
(Continued)

(52) U.S. Cl.
CPC .................. *A23K 10/28* (2016.05); *A23J 3/08* (2013.01); *A23K 20/147* (2016.05); *A23K 40/25* (2016.05);
(Continued)

(58) Field of Classification Search
CPC ...... A23K 10/28; A23K 20/147; A23K 40/25; A23K 50/42; A23K 50/45; A23K 50/48;
(Continued)

(56) References Cited

U.S. PATENT DOCUMENTS 2,555,514 A    6/1951  Francis et al.
2,695,235 A    11/1954 de Goede
(Continued)

FOREIGN PATENT DOCUMENTS

DE  102012216990    *  3/2013  ............... A23J 3/08
EP  0241097 A1       10/1987
GB  1494502         *  2/1975  ............... A23J 1/20

OTHER PUBLICATIONS

Machine Translation of DE102012216990 from IP.com, Translation run Sep. 2022, pp. 1-10. (Year: 2022).*

(Continued)

*Primary Examiner* — Trevor Love
(74) *Attorney, Agent, or Firm* — Morrison & Foerster LLP

(57) ABSTRACT

A pet food product is provided in which the protein fraction thereof comprises micro-particulate, denatured whey protein isolate, wherein the whey protein isolate contains at least 90 wt % protein, and optionally, animal protein. If animal protein is present, it may not comprise protein derived from functional organs, and the protein fraction may desirably be formed into a homogenous matrix. Processes for making the pet food product are also provided.

19 Claims, 2 Drawing Sheets

(51) Int. Cl.
    *A23K 20/147*    (2016.01)
    *A23K 40/25*     (2016.01)
    *A23K 50/42*     (2016.01)
    *A23K 50/45*     (2016.01)
    *A23K 50/48*     (2016.01)

(52) U.S. Cl.
    CPC .............. *A23K 50/42* (2016.05); *A23K 50/45* (2016.05); *A23K 50/48* (2016.05)

(58) Field of Classification Search
    CPC .. A23K 50/40; A23J 3/08; A23J 3/227; Y02P 60/87
    See application file for complete search history.

(56) References Cited

U.S. PATENT DOCUMENTS

| | | |
|---|---|---|
| 3,469,995 A | 9/1969 | Jacoby et al. |
| 3,653,908 A | 4/1972 | Buck et al. |
| 3,713,837 A | 1/1973 | Leidy et al. |
| 3,812,268 A | 5/1974 | Konigsbacher et al. |
| 4,168,322 A | 9/1979 | Buckley et al. |
| 4,247,562 A | 1/1981 | Bernotavicz |
| 5,792,504 A | 8/1998 | Poppel et al. |
| 6,635,301 B1 | 10/2003 | Howsam |

OTHER PUBLICATIONS

Kaskatdairy, Sodium Caseinate, 2016, Kaskat.com, 1 page. (Year: 2016).*

Kern, Nancy, The Facts You Need Before Feeding Your Dog a Fiber Regiment, 2001, Whole Dog Journal, pp. 1-5. (Year: 2001).*

IT'IS Foundation, Tissue Properties, 2023, https://itis.swiss/virtual-population/tissue-properties/database/density/, Last accessed Sep. 20, 2023, pp. 1-6. (Year: 2023).*

Hung et al., "Functionality of milk proteins and corm germ protein flour in comminuted meat products," Journal of Food Quality, 15:139-152, 1992.

Onwulata, et al., Functionality of Extrusion—Texturized Whey Proteins, American Dairy Science Association, Journal of Dairy Science, vol. 86, No. 11:3775-3782, Jun. 2003.

Onwulata, et al., Properties of Whey Protein Isolates Extruded under Acidic and Alkaline Conditions, American Dairy Science Association, Journal of Dairy Science, vol. 89, No. 1:71-81, Jan. 2006.

Wolz et al., "High moisture extrusion for microparticulation of whey proteins—Influence of process parameters," Journal of Food Engineering, 185:56-61, 2016.

* cited by examiner

PET FOOD PRODUCT

CROSS REFERENCE TO RELATED APPLICATIONS

This application is a national stage application, filed under 35 U.S.C. § 371, of International Application No. PCT/US2018/000237, filed on Aug. 16, 2018, which claims priority to United Kingdom Application No. 1713155.8, filed Aug. 16, 2017, the entire contents of which is hereby incorporated by reference herein for any and all purposes.

FIELD

The invention relates to the use of denatured whey protein in pet food products, to the pet food products themselves and processes for the preparation of the pet food products.

BACKGROUND

Pet foods have long been manufactured from animal by-products and non-animal derived ingredients in order to prepare high quality food that provides the pet with the required nutrient profile without competing with the human food demand for meat. As the global population increases the global demand for high protein foods including meat is expected to increase, so an increasing need for pet foods prepared from alternative proteins while meeting the nutritional needs of pets is expected. It would be desirable to meet these needs without increasing (and preferably whilst reducing) the environmental impact, particularly in respect of deforestation and climate change, of growing populations. There is, therefore, an increasing need for pet foods to be manufactured from more sustainable proteins.

Replacing meat protein with alternative proteins in pet foods requires a number of issues to be addressed, e.g. the products must have integrity, they must be palatable to the pet and must have textures and smells that are desirable to both the pet and the pet owner. It is also preferable for new analogue products to be prepared and processed using existing processing assets, and using recipes which are otherwise the same as, or similar to, existing products.

In addition, it would be desirable to provide ingredients which are more efficient in terms of functionality and product feeding performance.

There is therefore a particular need for pet foods incorporating a higher amount of non-meat protein while maintaining or improving high levels of nutrition and product quality.

Pet food is commonly categorized on the basis of its moisture content:
(1) Dry or low moisture content products (defined herein as exhibiting less than 20 wt % moisture content). These products typically combine high nutritional content with convenience.
(2) Semi-moist or semi-dry or soft dry or intermediate or medium moisture content products (defined herein as exhibiting from 20 to 50 wt % moisture content).
(3) Wet or high moisture content products (defined herein as exhibiting greater than 50 wt % moisture content). These products are generally most palatable to pets.

The present invention is particularly directed towards wet pet food, of which there are two main types.

The first type of wet pet food product is known as 'pâté' or 'loaf' and is typically prepared by processing a mixture of edible components under heat to produce a homogeneous semi-solid mass that is structured using hydrocolloids or by heat-coagulated protein. This homogeneous mass is usually packaged into single serve or multi serve packaging which is then sealed and sterilized. Upon packing, the homogeneous mass assumes the shape of the container.

The second type of wet pet food product is known as 'chunk-in-gravy', 'chunk-in-jelly' or 'chunk-in-mousse', depending on the nature of the sauce component, and these types of products are referred to generically herein as 'chunk-in-sauce' products. The present invention is particularly directed to 'chunk-in-sauce' wet pet food products. The chunks comprise meat pieces or restructured meat pieces. Restructured meat pieces may suitably be prepared by making a meat emulsion containing a heat-settable component, and by applying thermal energy to 'set' the emulsion and allowing it to assume the desired shape. The product pieces are combined with a sauce (e.g. gravy, jelly or mousse) in single serve or multi serve packaging which is then sealed and sterilized.

Many wet pet food products contain a significant amount of meat and animal by-products. Reconstitution of animal by-products into aesthetically pleasing restructured or reconstituted meat chunks is a key feature of most wet pet food products. A widely used technology relies on the heat setting of meat proteins and the addition of heat-settable binders. Soluble meat proteins coagulate and create a strong matrix when heated above 80° C. Additives such as dried animal blood plasma and other heat-setting binders are included to give sufficient chunk strength, particularly such that the matrix is able to withstand the retort/sterilisation process described herein below.

A particularly common protein source in pet foods, particularly wet pet foods, are the functional organs of an animal such as liver, kidney, spleen, lung etc., of which liver is of particular interest as it is commonly contained in a wide range of pet food products. Such functional organs may be, for instance chicken, porcine or bovine in origin, which are typically used in tandem with other animal-derived protein sources. For the reasons noted above, it would be desirable to provide a partial or complete replacement (preferably a complete replacement) for such functional animal organs in reconstituted meat chunks and pet food products (particularly wet pet foods), particularly wherein the physical characteristics of the reconstituted meat chunks and said pet food products are maintained or improved.

One physical characteristic of the reconstituted meat chunks which is of particular importance is chunk strength (resilience) or hardness. A chunk which is too weak or too soft is more easily broken or fragmented, which undesirably reduces the stability and cohesiveness of the chunk. In addition, this can result in small pieces or "fines" (solid material with a longest dimension of no more than 3 mm) being present in the product, which is undesirable for a number of reasons. For instance, fines tend to migrate to the surface of the product and are visible to the consumer (i.e. the pet owner) upon opening of the packaged product, which generates an undesirable perception of a lack of freshness or quality. Fines also cause blockage of filling equipment leading to uncontrolled variability in product quantities and rejection by automated weighing systems. The chunk should also be sufficiently strong and stable so that it is able to withstand the retort/sterilisation steps of the packaging process.

A further consideration for replacement products is that they should desirably be processable using existing equipment. For instance, the reconstituted meat chunks should desirably not exhibit a tack or stickiness which would cause the chunks to stick to the conveyors used to transport them during manufacture, thereby resulting in the need to clean and un-block the conveyors causing undesirable equipment down-time. Thus, any analogue product using replacement ingredients should not exhibit increased tack or stickiness, relative to existing products (in particular, existing products which contain functional organs of an animal, such as liver).

In addition, the pet food product must exhibit a texture and smell such that it is palatable to the pet. Thus, any analogue product using replacement ingredients should at least maintain the palatability of existing products (in particular, existing products which contain functional organs of an animal, such as liver).

SUMMARY

It is an object of this invention to address one or more of the afore-mentioned problems.

According to a first aspect of the present invention, there is provided a pet food product, particularly a wet pet food product, wherein the protein fraction of the pet food product comprises denatured whey protein.

According to a second aspect of the present invention, there is provided the use of denatured whey protein as a protein source in a pet food product, particularly a wet pet food product, particularly wherein the use of said denatured whey protein is as a full or partial replacement for protein derived from functional animal organs (such as liver) in a pet food product.

According to a third aspect of the present invention, there is provided a process for the preparation of a pet food product comprising:
(i) denaturing whey protein; and
(ii) using the denatured whey protein as a protein source in the pet food product.

The denaturing of the whey protein preferably comprises the following steps:
(1) mixing whey protein and water at elevated temperature, preferably while simultaneously applying a shear force to the mixture, to provide denatured whey protein; and
(2) cooling the denatured whey protein from step (1), preferably while simultaneously applying a shear force to the denatured whey protein.

According to a fourth aspect of the invention, there is provided a dry or semi-moist pet food product, i.e. a product exhibiting less than 20 wt % moisture or from 20 to 50 wt % respectively, comprising or consisting essentially or consisting of the reconstituted animal material described herein. The reconstituted animal material may also be incorporated into pet food products generally, including supplements, snacks and treats, such as a dry kibble product.

According to a fifth aspect of the invention, there is provided a process for preparing the reconstituted animal material described hereinabove, wherein said process comprises preparing said reconstituted animal material by an extrusion process at elevated temperature.

According to a sixth aspect of the invention, there is provided a process for preparing reconstituted animal material, preferably as described hereinabove, said process comprising the steps of:
(a) mixing denatured whey protein with an animal protein source;
(b) preferably, preparing a slurry from said mixture and subjecting the slurry to conditions of shear to produce an emulsion of said mixture;
(c) heating the mixture to an internal temperature of at least 70° C. (preferably at least about 80° C.); and
(d) forming discrete pieces of reconstituted animal material.

According to a seventh aspect of the invention, there is provided a process for preparing a wet pet food product comprising reconstituted animal material comprising denatured whey protein and animal protein, preferably as described hereinabove, said process comprising the steps of:
(a) mixing said denatured whey protein with an animal protein source as described herein;
(b) preferably, preparing a slurry from said mixture and subjecting the slurry to conditions of shear to produce an emulsion of said mixture;
(c) heating the mixture to an internal temperature of at least 70° C. (preferably at least about 80° C.);
(d) forming discrete pieces of reconstituted animal material;
(e) optionally combining said reconstituted animal material with a sauce
(f) inserting said reconstituted animal material and optional sauce into packaging and
(g) sealing and sterilizing the package to provide a packaged wet pet food product.

DETAILED DESCRIPTION

Figures 1A, 1B, 1C, 1D:
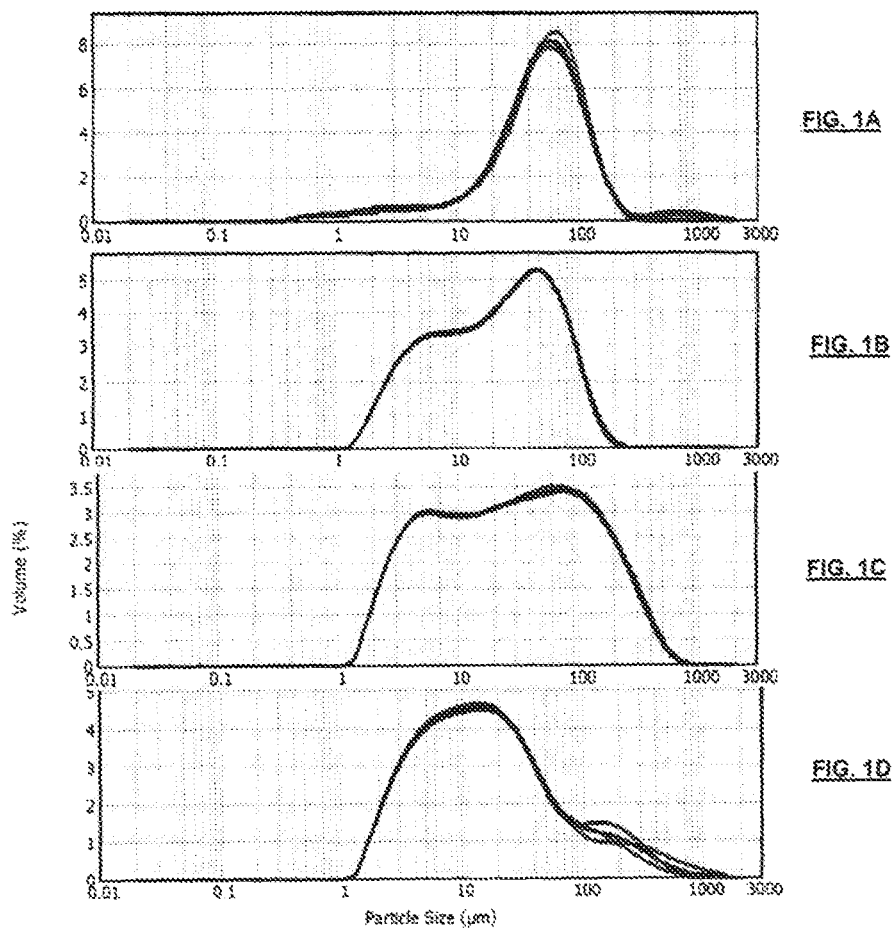
FIG. 1A is a graph showing the particle size distribution of the native whey protein isolate (WPI) starting material.
FIG. 1B is a graph showing the particle size distribution of the micro-particulated, denatured whey protein isolate (WPI) produced according to Example 1.
FIG. 1C is a graph showing the particle size distribution of the micro-particulated, denatured whey protein isolate (WPI) produced according to Example 2.
FIG. 1D is a graph showing the particle size distribution of the micro-particulated, denatured whey protein isolate (WPI) produced according to Example 3.

Whey protein is present in milk and is a waste product of cheese-making. The most abundant proteins in whey are β-lactoglobulin and α-lactalbumin. Whey protein has been investigated extensively as a protein source, particularly in human food and beverage products, and it may be found in such commercially available products as infant formula, food supplements, sports bars and beverages. However, a barrier to its use in pet food products, particularly wet pet food products, is its low gelling ability and poor network formation with animal proteins, particularly when including in meat emulsions. Thus, there is a difficulty in combining whey protein with animal protein whilst maintaining the important characteristics of the pet food product, particularly rheology, texture, strength and palatability. The present inventors have unexpectedly found a process by which the potential of whey protein can be harnessed and utilized as a protein source in pet food products in which the protein fraction also comprises animal protein, whilst simultaneously maintaining the quality of the pet food product, and using otherwise conventional recipes and processes. The denatured whey protein exhibits excellent binding ability, in particular the ability to connect and form a homogeneous network with other proteins, particularly animal proteins, encapsulating and/or binding the water and fat present in the composition of the pet food product. Unexpectedly, the denatured whey protein also exhibits excellent sterilisation-stable gelling properties.

Thus, the pet food product described herein preferably comprises a protein fraction comprising denatured whey protein and further comprising animal protein. Preferably, the protein fraction of the pet food product does not comprise animal protein derived from functional organs of an animal, particularly liver. Thus, preferably the pet food product does not comprise functional organs of an animal, particularly liver.

As used herein, the term "animal protein" means protein derived from the muscle, organs, tissues, tendons and/or bone of an animal. Animal proteins include any protein of animal origin (including vertebrate and invertebrate animals), e.g. proteins derived from mammals, fowl, fish and insects. Examples of suitable animal proteins include those derived from chicken, turkey, beef, lamb, pork, venison, buffalo, duck, kangaroo, shell fish, crustaceans, salmon, tuna, whitefish and the like. Animal protein is preferably from a vertebrate animal, including mammals, fowl and fish. The animal protein may be ground animal material, said ground animal material preferably being selected from meat and animal by-products and combinations thereof. At least a portion of the animal protein may be protein derived from muscle, organs, tissues and tendons, but preferably not protein derived from functional organs of an animal. The ground animal material may contain at least 50 wt %, or at least 70 wt % or at least 85 wt % of animal by-product. Animal by-products are the entire bodies or parts of bodies of animals or products of animal origin not intended for human consumption; such by-products are conventional in the art for the manufacture of ground animal material suitable for use in pet food products. Animal tissue may comprise animal blood plasma, preferably dried animal blood plasma, which is a protein source conventionally used in the preparation of pet food products. Preferred animal blood plasma may be porcine or bovine blood plasma or mixtures thereof. It will be appreciated that the term "animal protein" excludes materials produced and secreted externally by a live animal, such as milk, eggs and the like.

As used herein, the term "functional organs of an animal" refers to organs such as liver, kidney, spleen, lung etc.

The whey protein used in the present invention may be whey protein concentrate (typically at least 25 wt % and less than 90 wt % protein) or whey protein isolate, and is preferably whey protein isolate (WPI), containing at least 90 wt %, and typically no more than about 95 wt % protein. The whey protein isolate preferably contains no more than 1 wt % lactose and/or no more than 1 wt % fat.

Gelation of whey protein occurs at a gelation temperature ($T_g$) of about 80° C. and above. In contrast, animal protein, particularly meat protein (suitably derived from muscle and/or tissues and/or tendon), of the sort typically used in pet food products have lower gelation temperatures of around 65° C. It is this differential in gelation temperatures which has hitherto been problematic in incorporating whey protein into food products which also contain animal protein such as meat protein. Thus, native whey protein fails to undergo significant aggregation or interaction with animal protein because, while the animal protein has already formed a gel during cooking, whey proteins remain part of a weak and unstable structure. The cooking process then results in the formation of regions of gelled whey proteins which appear as inclusions within the animal protein matrix. For instance, the addition of native whey protein to comminuted meats is known to have a deleterious effect on the texture of cooked products, such as frankfurters (Hung et al., Journal of Food Quality, 15, 1992, 139-152). The different gelation temperatures of these ingredients mean that, when combined into a single composition, different regions of the matrix have different textures and morphologies. The resulting textural inhomogeneity is detrimental to the characteristics of the final product, including its strength, texture, cohesiveness and appearance. The inventors have identified and overcome this problem by denaturing the whey protein prior to combination with the animal protein. The denatured whey protein has a lower gelation temperature, rendering it more compatible with the animal protein.

The denatured whey protein is preferably prepared using the thermal and mechanical energy of an extrusion process, preferably a high-moisture extrusion process. Whey protein denatures at temperatures of about 65° C. and above, when the hydrogen bonding and other electrostatic interactions which normally retain the protein in its natural molecular conformation start to break, and the protein unfolds. However, when in their unfolded form, the peptide chains are free to react with each other, resulting in polymerisation (for instance via the formation of hydrophobic interactions and disulfide bonds) and re-forming of hydrogen bonds, typically to produce a cross-linked three-dimensional network, and hence the chain entanglement and aggregation which is manifested as gelation. Thus, uncontrolled denaturing results in a gelled material which remains incompatible with animal protein. The denaturing and subsequent processes may be controlled to produce a denatured whey protein which is unfolded but without the polymerisation and entanglement which would otherwise occur (Wolz et al., Journal of Food Engineering, vol. 185, 2016, 56-61; and Onwulata et al., J. Dairy Science, 86, 3775-3782, 2003). The present inventors have surprisingly found that whey protein denatured in this way is able to interact with animal protein to form a homogeneous matrix without detriment to characteristics such as rheology, strength, texture and sensory attributes.

Thus, in the third aspect of the invention, the denaturing of the whey protein preferably comprises the following steps:
(1) mixing whey protein and water at elevated temperature, preferably while simultaneously applying a shear force to the mixture, to provide denatured whey protein; and
(2) cooling the denatured whey protein from step (1), preferably while simultaneously applying a shear force to the denatured whey protein.

Steps (1) and (2) are suitably conducted in a process that heats the material while controlling the particle size, e.g. using a scraped surface heat exchanger or an extruder, preferably a screw extruder, preferably a twin screw extruder.

In step (1), preferably the whey protein and water mixture has a moisture content of at least about 30 wt %, preferably at least about 35 wt %, preferably at least about 40 wt %, preferably no more than about 60 wt %, preferably no more than about 55 wt %, preferably no more than 50 wt %, preferably from about 40 wt % to about 50 wt %, and preferably about 45 wt % water. Such high-moisture extrusion processes are well-known in the art. Preferably water and whey protein powder are introduced into a mixing chamber and mixed prior to introduction into an extruder.

In step (1), the term "elevated temperature" means a temperature of at least 75° C., preferably at least 80° C., preferably at least 85° C., preferably at least 90° C., preferably no more than about 125° C., and preferably no more than about 120° C. Preferably step (1) is conducted at a temperature in the range of from about 90 to about 120° C.

In step (2), the denatured whey protein is cooled at a cooling temperature of no more than about 65° C. in order to avoid gelling immediately upon exit from the extruder, more preferably no more than about 60° C., and preferably no more than about 55° C., more preferably no lower than about 30° C., more preferably no lower than about 40° C., more preferably no lower than about 45° C., and typically about 50° C. The denatured whey protein is preferably cooled at a rate of at least about 10° C./min, preferably no more than about 20° C./min.

It will be appreciated that residence time in each zone of the extruder is dependent on, inter alia, throughput, extruder size and screw configuration. In one embodiment, step (1) is conducted for a period of at least about 0.04 minutes, and preferably no more than about 0.5 minutes. In that embodiment, step (2) is conducted for a period of at least about 0.04 minutes preferably at least about 0.1 minutes, preferably no more than about 2.5 minutes, preferably no more than about 1.0 minute.

The resulting denatured whey protein is unfolded but polymerization, entanglement, aggregation and gelation of the peptide chains have been avoided or reduced.

The resulting denatured whey protein is preferably in particulate form, preferably in micro-particulate form. As used herein, the term "micro-particulate" form preferably means a particle size of no more than about 45 µm, preferably no more than about 40 µm, preferably no more than about 35 µm, and preferably at least about 10 µm. As used herein, the term "particle size" refers to the volume distributed median particle diameter (equivalent spherical diameter corresponding to 50% of the volume of all the particles, read on the cumulative distribution curve relating volume % to the diameter of the particles—often referred to as the "D(v, 50)" value). The median particle size may be determined by plotting a cumulative distribution curve representing the percentage of particle volume below chosen particle sizes and measuring the $50^{th}$ percentile.

The particle size distribution is preferably such that the volume distributed D(v,90) value (i.e. equivalent spherical diameter corresponding to 90% of the volume of all the particles, read on the cumulative distribution curve relating volume % to the diameter of the particles) is no more than 200 µm, preferably no more than 150 µm, preferably no more than 120 µm, preferably no more than 100 µm.

The particle size distribution is preferably such that the volume distributed D(v,10) value (i.e. equivalent spherical diameter corresponding to 10% of the volume of all the particles, read on the cumulative distribution curve relating volume % to the diameter of the particles) is no more than 10 µm, preferably no more than 5 µm.

The volume mean diameter (also referred to as the D[4,3] value) is preferably no more than 70 µm, preferably no more than 60 µm, preferably no more than 50 µm.

The resulting denatured whey protein preferably has a degree of denaturation of at least about 75%, preferably at least about 80%, preferably at least about 85%, preferably at least about 90%, preferably at least about 95%, and preferably at least about 98%. The degree of denaturation is preferably measured by differential scanning calorimetry (DSC) as described herein. It will be appreciated that the percentage value of the degree of denaturation is the proportion of denatured protein compared to the native protein in the original sample.

The denatured whey protein is preferably incorporated into the pet food product in an amount such that the pet food product preferably comprises at least about 1 wt %, preferably at least about 2.5 wt %, preferably at least about 5 wt %, preferably at least about 7.5 wt %, preferably at least about 10 wt %, typically no more than about 40 wt %, typically not more than about 30 wt %, typically no more than about 25 wt %, typically not more than about 20 wt %, by total weight of the dry matter of the pet food product.

Thus, step (ii) of the third aspect of the invention comprises the step of incorporating the denatured whey protein into the pet food product. Preferably, step (ii) of the third aspect comprises the steps of combining the denatured whey protein with animal protein, incorporating the denatured whey protein into the pet food product.

The denatured whey protein is preferably incorporated into the pet food product (preferably a wet pet food product) in the form of reconstituted animal material comprising the denatured whey protein and animal protein. Thus, step (ii) of the third aspect preferably comprises the step of preparing reconstituted animal material comprising denatured whey protein and animal protein, and incorporating said reconstituted animal material into said pet food product.

The reconstituted animal material preferably comprises at least about 1 wt %, preferably at least about 5 wt %, preferably at least about 10 wt %, typically no more than about 40 wt %, typically not more than about 30 wt %, typically no more than about 25 wt %, typically not more than about 20 wt %, and in a preferred embodiment in the range of from about 10 to about 20 wt %, preferably from about 10 to about 17 wt % of said denatured whey protein, by total weight of the dry matter of the reconstituted animal material.

The reconstituted animal material may further contain additional ingredients conventionally used in the manufacture of reconstituted meat and pet food products (particularly wet pet food products), such as fat(s), antioxidant(s), carbohydrate source(s), fiber source(s), additional source(s) of protein (including vegetable protein), seasoning, colorant(s), flavouring(s), mineral(s), preservative(s), vitamin(s), emulsifier(s), farinaceous material(s) and combinations thereof.

The reconstituted animal material may be prepared by an extrusion process at elevated temperature, according to conventional techniques known in the art.

Preferably, the reconstituted animal material is prepared by a process comprising the steps of:
(a) providing an animal protein source (typically ground animal material, typically prepared by grinding pieces of animal material to prepare ground animal material, said animal material being selected from meat, animal by-products and combinations thereof);
(b) mixing the animal protein source with the denatured whey protein, and optionally additional ingredients, for instance the additional ingredients conventionally used in the manufacture of reconstituted meat and pet food products described hereinabove, to prepare a slurry;
(c) subjecting the slurry to conditions of shear to produce an emulsion;
(d) forming a layer of emulsion;
(e) heating the layer of emulsion to an internal temperature of at least 70° C. (preferably at least about 80° C.); and
(f) cutting or shredding the layer into discrete pieces of reconstituted animal material.

The ingredients may be mixed using any suitable equipment conventional in the art, for instance a heated extruder or a jacketed paddle mixer, optionally combining the ingredients with water.

In the process described above, said slurry preferably comprises from about 50 to about 95 wt % (preferably from about 60 to about 90 wt %, preferably from about 65 to about 90 wt %) of the animal protein source.

The emulsification of the slurry may be performed in any conventional equipment, for instance a bowl chopper, or meat grinders, including rotating knives and die-plate combinations comprising holes of a defined diameter (for instance from about 0.5 mm to about 10 mm) through which the material passes. Optionally, the resulting material may then be transferred to a mixer where water, dry ingredients and liquid ingredients may be added.

The layer of emulsion formed in the process may take the form of, for instance, a sheet, a slab, a ribbon or rope.

The emulsion is suitably heated to an internal temperature of at least 70° C., preferably at least 75° C., preferably at least 80° C., and typically no more than about 105° C. The duration of heating is at least 30 seconds, preferably from about 1 to about 60 minutes. The heating of the layer of emulsion is suitably conducted in a steam tunnel.

The layer of emulsion is suitably heated from above by bringing steam into direct contact with the layer of emulsion and/or from below by applying steam to the underside of a continuous belt carrying said layer. Preferably, the emulsion is cooked in a steam tunnel, typically comprising a conveyor system (such as a conveyor belt), which blanches or cooks the emulsion with saturated or super-heated steam injected from above and/or below, thereby exposing the emulsion to a continual and even application of steam to ensure it is cooked thoroughly and set. The emulsion may be in the form of individual chunks during the heating step, but typically cutting into chunks is performed after the heating step.

As used herein, the term "emulsion" refers to a thick mixture of water and other substances derived from raw materials, such as meat or meat by-products. These "emulsions" are dispersions of fat particles and air bubbles in a complex phase composed of water, solubilized meat protein, cellular components and other ingredients. The emulsions may also be referred to as a meat "batter" or a meat "slurry". Such terms are well understood in the art and are used interchangeably. Typically, the emulsions comprise a continuous phase which is an aqueous medium comprising soluble proteins, soluble muscle constituents, segments of muscle fibers, connective tissue fibers, bones etc., and optionally further additives conventional in the art, including materials of plant origin, such as starches and/or fibers, and minerals.

Other methods to form the reconstituted animal material include the high moisture extrusion techniques described in WO-00/69276-A. Another suitable process for making the reconstituted animal material is described in U.S. Pat. No. 4,247,562.

A particular advantage of the present invention is the ability to use standard processing and equipment to form the reconstituted animal material.

The total protein content of the reconstituted animal material is preferably in an amount in the range of from about 5 to about 40 wt %, preferably at least about 10 wt %, preferably at least about 15 wt %, and typically no more than about 36 wt %, and preferably from about 25 wt % to about 36 wt %. The protein fraction of the reconstituted animal material preferably contains at least 50 wt % of animal protein, preferably at least about 60 wt %, preferably at least about 70 wt %, preferably at least about 80 wt % of animal protein, by total weight of the protein fraction of the reconstituted animal material. The protein fraction may further comprise protein derived from the egg of an animal, or otherwise derived from an animal, for instance casein. The protein fraction may comprise vegetable proteins including proteins derived from soya, wheat, maize, pea, lupine, potato and the like, for example wheat gluten. The proteins may be in any suitable form, including but not limited to, isolated or partially isolated, concentrated or ground.

The fat content of the reconstituted animal material is preferably less than about 15 wt %, preferably no more than about 13 wt %, preferably no more than about 12 wt %, preferably no more than about 10 wt %, preferably no more than about 8 wt %, preferably at least about 2 wt %, preferably at least about 4 wt %. The term "fat" as used herein refers to esters of fatty acids such as triglycerides, diglycerides, monoglycerides and phospholipids. The fat preferably contains at least 50 wt %, more preferably at least 70 wt % of triglycerides. The fat may suitably contain animal fat, vegetable oil, marine oil and combinations thereof. Typically, the fat contains at least 10 wt %, more preferably at least 30 wt % and most preferably at least 50 wt % of an animal fat. The animal fat preferably originates from an animal selected from cattle, pigs, sheep, goat, poultry, fish and combinations thereof.

The water content of the reconstituted animal material is typically up to about 75 wt %, or up to about 65 wt %, and typically at least about 20 wt % or at least about 30 wt % or at least about 40 wt % or at least about 50 wt %, and preferably in the range of from about 50 to about 55 wt %, by total weight of the reconstituted animal material.

The fiber and carbohydrate content of the reconstituted animal material is typically up to about 20 wt %, by total weight of the reconstituted animal material. Preferably, the reconstituted animal material comprises no more than about 10 wt % fiber, preferably no more than about 5 wt %, preferably no more than about 2 wt %, typically no more than about 1 wt %, and preferably at least about 0.5 wt %, by total weight of the reconstituted animal material.

The reconstituted animal material typically exhibits a density of from about 0.8 to about 1.2 g/mL.

The size of the reconstituted animal material will vary and depends on the animal that is to consume the pet food and/or the format of the pet food. The longest dimension of the reconstituted animal material is typically from about 5 mm to about 200 mm, preferably at least about 10 mm, preferably no more than about 150 mm. Where the reconstituted animal material is a chunk suitable for a chunk-in-sauce product, as described herein below, the longest dimension is preferably no more than about 50 mm, more preferably no more than about 40 mm, more preferably no more than about 30 mm, and in a preferred embodiment from about 5 mm to 25 mm, preferably from about 13 to about 20 mm.

The reconstituted animal material may also be referred to as a "meat analogue."

The term "pet food" as used herein refers to a food composition designed for ingestion by a pet. The wet pet food provided herein is preferably a nutritionally balanced food product to provide a pet with all the essential nutrients it needs in the appropriate quantities.

The pet food may be a pet food providing health and/or nutrition benefits to the pet, e.g. weight management pet foods, satiety pet foods and/or pet foods capable of improving renal function in the pet.

The wet pet food product and the components used therein are selected for consumption by a pet and are not intended for consumption by humans. The term "pet" as used herein preferably refers to a domestic animal, preferably a companion animal, particularly cats or dogs.

The wet pet food may be a loaf (or pâté) product. As noted above, such products are normally in the form of a single piece of reconstituted animal material packaged in a container, such as a can, a pouch or a tray. Typically, these shaped pieces of reconstituted animal material have a piece volume of from about 20 to about 2,000 cm$^3$, more preferably from about 40 to about 1,500 cm$^3$, for instance from about 500 to about 1200 cm$^3$. After packaging and sealing, the aforementioned product is preferably sterilized within the package, e.g. by retort sterilization Alternatively, the wet pet food is a chunk-in-sauce product, as described herein above. The term "sauce" as used herein encompasses gravies, jellies and mousses, and preferably refers to a composition in the form of a fluid, a paste, a gel or a mousse. The sauce comprises a liquid carrier, such as water, fats or oils. Preferably the composition is an aqueous composition. A chunks-in-sauce product is prepared by combining the pieces of reconstituted animal material with a sauce, packaging the combination, sealing in the package and sterilizing the package, e.g. by retort sterilization. The pieces of reconstituted animal material may be added to the packaging while the sauce is poured over the pieces, for instance a heated sauce which allows the pieces to warm up and trapped gases to be expelled prior to sealing the packaging. Alternatively, ingredients are added to the reconstituted animal material and packaged, where the ingredients, in the usual sterilisation process, result in the formation in the package of the sauce mixed with the reconstituted animal material.

Sealing of the packaging may be and preferably is conducted using vacuum-sealing.

Retort sterilization is preferably conducted at a retorting temperature in the range from about 115° C. to about 130° C., preferably for approximately 20 to 120 minutes, in order to produce a commercially sterile product.

The packaging may suitably be a can (or tin) or jar (e.g. glass) or otherwise a plastic, metal, foil pouch, or flexifoil.

The wet pet food product may comprise up to 100 wt % of the reconstituted animal material, and preferably at least about 5 wt % of the reconstituted animal material, by total weight of the wet pet food product. In other words, the wet pet food product may comprise, consist essentially or consist of the reconstituted animal material. A loaf product suitably consists essentially or consists of the reconstituted animal material. A chunks-in-sauce product preferably comprises a ratio of reconstituted animal material:sauce of from about 20:80 to about 90:10, preferably at least about 30:70, preferably at least about 40:60, preferably at least about 50:50, preferably at least about 60:40.

The sauce component of the wet pet food product may be any suitable sauce conventional in the art of wet pet food, and typically exhibits a water content of at least about 80 wt %, typically at least about 90 wt %, typically no more than about 98 wt %, by total weight of the sauce. The sauce typically comprises a thickening agent which is used to control its consistency. Thickeners or gelling agents that may be used to prepare the sauce include carrageenan, xanthan, guar gum, cassia gum, starch, gelatine, CMC, LBG, TARA gum and combinations thereof. The sauce is typically a coating which surrounds the reconstituted animal material.

The sauce may contain additional ingredients conventionally used in the manufacture of wet pet food products, such as fat, antioxidants, carbohydrates, seasoning, colorants, flavouring, minerals, preservatives, vitamins, emulsifiers, farinaceous materials and combinations thereof. The sauce preferably comprises one or more flavouring agents.

Flavourings impart particular taste or smell and may be derived from natural ingredients or artificially created. Flavourings may include one or more products of the Maillard reaction. Flavouring agents such as beef flavour and meat flavour can be used in amounts sufficient to impart the desired flavour.

The total protein content of the chunk-in-sauce wet pet food product is preferably in the range of from about 5 to about 20 wt %, preferably from about 5 to about 10 wt %, by total weight of the product.

The total fat content of the chunk-in-sauce wet pet food product is preferably no more than about 15 wt %, preferably no more than about 10 wt %, preferably no more than about 7 wt %, preferably at least about 2 wt %, by total weight of the product.

The total fiber content of the chunk-in-sauce wet pet food product is preferably no more than about 5 wt %, preferably no more than about 2 wt %, preferably no more than about 1 wt %, preferably at least about 0.1 wt %, by total weight of the product.

The water content of the chunk-in-sauce wet pet food product is typically at least about 70 wt %, preferably at least about 75 wt %, and preferably at least about 80 wt %, preferably no more than about 95 wt %, preferably no more than about 90 wt %, by total weight of the product.

Preferably, the amount of fines (i.e. solid material having a longest dimension of no more than 3 mm) in the chunk-in-sauce wet pet food product is no more than about 10 wt %, preferably no more than about 8 wt %, preferably no more than about 5 wt %, preferably no more than about 3 wt %, by total weight of the wet pet food product.

The present invention will now be described with reference to the following non-limiting examples.

EXAMPLES

Figure 3:
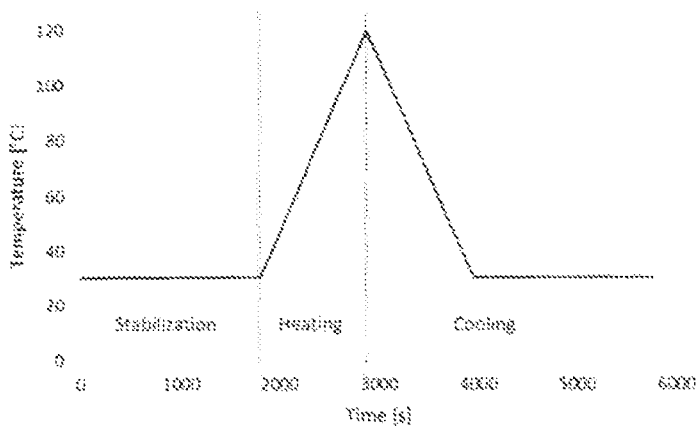
FIG. 3 is a graph of the temperature profile used in the differential scanning calorimety (DSC) testing described in the Examples.

Measurement Methods (i) The degree of denaturation was measured by differential scanning calorimetry (DSC), using the following procedure. Approximately 50 mg of a whey aqueous solution (5% w/w) was weighed into a 120 μL aluminium crucible, sealed and analysed in a micro-calorimeter (SETARAM Instrumentation, Caluire, France)), using an empty crucible as reference. The scan was performed using the temperature profile shown in FIG. 3 at a scanning rate of 5° C./min. Curve manipulation and integration was performed by selecting the data from the first ramp (30° C. to 120° C.) and then cutting to the signal from 50° C. to 100° C. The curve is integrated using the sigmoidal tangential mode. The degree of denaturation was calculated by comparing the heat flow of the denatured WPI samples with native WPI with over the width of the denaturation peak.

(ii) Particle size was measured by laser light diffraction, in particular by static light scattering. A suitable instrument is a Mastersizer (e.g. a 2000) available from Malvern Instruments Ltd. The particles were dispersed in water (20% w/w) for the analysis.

(iii) Rheology. The standing viscosity, pumping viscosity and high-shear viscosity was measured in a viscometer (Brookfield DV1, AMETEK, Lorch, Germany).

(iv) Texture Profile Analysis was conducted on a TA.TX plus texture analyser (Stable Micro Systems, Surrey, UK), equipped with a 5 kg probe, and using a double compression method. The chunk is first compressed to 50% of its original chunk height, the pressure released, and the chunk then compressed a second time to 50% of its chunk height. The following parameters were measured:

Hardness: the peak force during the first compression
Adhesiveness: the negative work between the two cycles
Cohesiveness: describes how well the product withstands a second deformation relative to its resistance under the first deformation; calculated as the area of work during the second compression divided by the area of work during the first compression
Chewiness: Hardness×Cohesiveness×Springiness (The parameter "springiness" is measured by squeezing the chunk and then releasing it; the chunk "bounces" back upon release and attains a certain height; this new height, divided by the original height is the "springiness").

Examples 1 to 3

Whey protein isolate (WPI) powder having a protein content of 91 wt % was mixed with water in the mixing chamber of a multi-zone twin-screw extruder, to provide a mixture having a water content of 45 wt %. The feed rate of water and whey protein isolate powder was 5.93 kg/h and 8.16 kg/h, respectively. The extruder was operated with a screw speed of 800 rpm. The extruder had 10 segments and comprised a heating zone and a cooling zone. The heating zone of the extruder had a length of 510 mm, and the cooling zone of the extruder had a length of 290 mm. The maximum temperature of the heating zone was either 90° C. (Example 1), or 105° C. (Example 2) or 120° C. (Example 3). The WPI/water mixture was passed into the heating zone of the extruder to denature the whey protein, and the denatured whey protein was then passed into the cooling zone of the extruder where it was cooled at successive temperatures of 50° C. and 30° C. The temperature profile of the extruder is shown in Table 1 below. The mixture spent up to 0.2 minutes in the heating zone and 0.05 minutes in the cooling zone. The residence time in the extruder was no more than about 15 seconds.

TABLE 1

| Barrel temperature profile (° C.) for segments 1 to 10 of the extruder | | | | | | | | | |
|---|---|---|---|---|---|---|---|---|---|
| 1 | 2 | 3 | 4 | 5 | 6 | 7 | 8 | 9 | 10 |
| Example 1 | 30 | 50 | 50 | 90 | 90 | 90 | 50 | 50 | 30 | 30 |
| Example 2 | 30 | 50 | 50 | 105 | 105 | 105 | 50 | 50 | 30 | 30 |
| Example 3 | 30 | 50 | 50 | 120 | 120 | 120 | 50 | 50 | 30 | 30 |

The cooled mixture was extruded through a die end plate having a single hole of 5 mm diameter.

The resulting denatured whey protein is in micro-particulate form, having the particle size shown in Table 2 below. The particle size distributions are shown in FIG. 1, with multiple lines indicating additional samples evaluated to show reproducibility. As shown, particle size decreases with increasing temperature in the heating zone, e.g., the particle size of the Example 3 samples that were exposed to greater barrel temperatures in segments 4-6 than the Example 1 and 2 samples is less than the Example 1 and 2 samples.

TABLE 2

|  | D(0, 1) (μm) | D(0, 5) (μm) | D(0, 9) (μm) | D[4, 3] (μm) |
|---|---|---|---|---|
| WPI starting material | 10.64 | 49.92 | 118.24 | 59.16 |
| Example 1 | 4.52 | 31.93 | 94.03 | 46.73 |
| Example 2 | 3.65 | 32.34 | 192.48 | 69.45 |
| Example 3 | 2.94 | 11.98 | 85.31 | 37.81 |

The degree of denaturation for each sample, measured as described herein, is shown in Table 3.

TABLE 3

|  | Heat (J · g$^1$) | Peak width (° C.) | Degree of denaturation (%) |
|---|---|---|---|
| WPI starting material | 0.786 | 63.28-94.86 | 0 |
| Example 1 | 0.041 | 67.01-77.07 | 94.78 |
| Example 2 | 0.013 | 67.11-73.03 | 98.35 |
| Example 3 | 0.013 | 69.66-75.35 | 98.35 |

The results demonstrate that the process of the present invention allows denaturing of the whey protein without giving rise to uncontrolled polymerisation and aggregation.

Examples 4 to 12

The resulting denatured whey protein in each of Examples 1 to 3 was fully dispersible in water at room temperature, and able to be combined with an animal protein to form a reconstituted animal material. A series of experiments was conducted, in which each of Examples 1 to 3 was used as an ingredient in the manufacture of a reconstituted animal material in accordance with conventional techniques and using a conventional recipe, the output being chunks having dimensions of about 10 mm×10 mm×10 mm. A Reference Example using the conventional recipe was also made by adding porcine liver to approximately 830 g of meat emulsion, such that the liver was present at 17 wt % of the dry matter of the reconstituted animal material. For each of Examples 1 to 3, the denatured whey protein was incorporated into the reconstituted animal material at a level of 10, 13.5 and 17 wt %, by total weight of the reconstituted animal material, to provide Examples 4 to 12, in accordance with the templates shown in Table 4 below. In Table 4, "MPV" refers to the micro-particulated denatured whey of Examples 1 to 3. In Table 4, moisture contents were calculated based on a moisture content of 45 wt % for the micro-particulated whey protein, and a moisture content of 78.35 wt % for the liver. Recipes were calculated so that every recipe retains the same amount of dry solids compared to the existing recipe. Thus, in Examples 4 to 12, additional water was included in order to keep the moisture level of the liver replacement (the "templates" noted in Table 4) at the same level as the liver in the original recipe, i.e. at 78.35%. The basis of this calculation is 1 kg emulsion.

TABLE 4

| Example | Template | MPW in recipe (%) | Liver in recipe (%) | Liver (g) | MPW (g) | Water added (g) | Moisture (g) |
| --- | --- | --- | --- | --- | --- | --- | --- |
| Reference | — | 0 | 17 | 170 | 0 | 0 | 78.35 |
| Ex. 4, 7, 10 | 10% | 10 | 7 | 70 | 39.36 | 60.64 | 78.35 |
| Ex. 5, 8, 11 | 13.5% | 13.5 | 3.5 | 35 | 53.14 | 81.86 | 78.35 |
| Ex. 6, 9, 12 | 17% | 17 | 0 | 0 | 66.92 | 103.08 | 78.35 |

Figure 2:
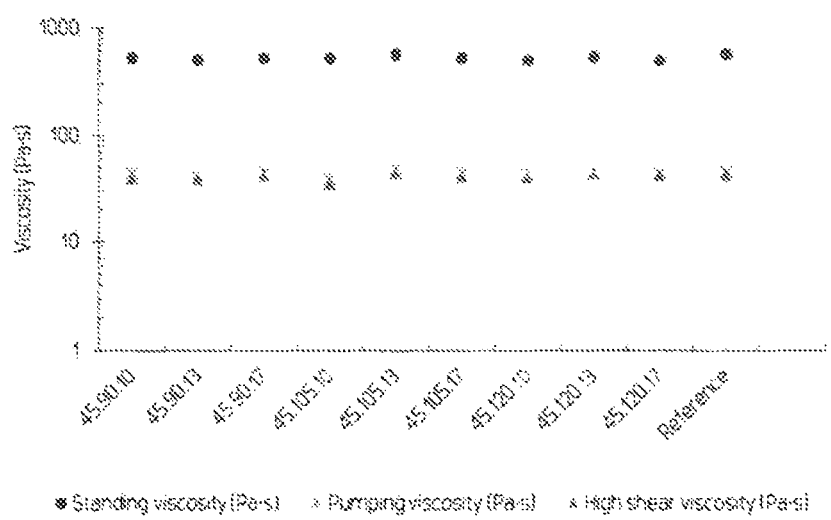
FIG. 2 is a graph showing the standing viscosity, pumping viscosity and high shear viscosity of each sample produced in Examples 4-12 and a reference sample.

FIG. 2 shows the rheological behaviour of the samples, demonstrating that Examples 4 to 12 exhibit the same rheology as the conventional recipe of the Reference Example.

Upon visual inspection, the freshly made chunks of each of Examples 4 to 12 exhibited excellent form and structure, and were similar in appearance to the conventional recipe of the Reference Example.

The chunks (50 g) from each sample were placed into a pouch with water (50 g), and the pouch sealed and then retorted (sterilised) under conventional conditions. The pouch was maintained for two weeks at 25° C. After two weeks, the pouches were opened and the chunks inspected as before. In all cases, the mature chunks of Examples 4 to 12 exhibited excellent form and structure, and were similar in appearance to the conventional recipe of the Reference Example. No crumbling, stickiness or dryness was observed. This test represents an accelerated ageing test to gauge how the chunks behave in a conventional gravy or sauce when retorted and stored.

The freshly made and mature chunks were also tested by texture profile analysis (TPA) as described herein. The results show that each of Examples 4 to 12 exhibited hardness, adhesiveness, cohesiveness and chewiness which was substantially equivalent to, and within acceptable quality control limits for, the existing commercial product, as represented by the Reference Example, in respect of both the fresh chunk and the mature chunk.

A Comparative Example was also made and tested, in which un-denatured whey protein isolate (i.e. as supplied) was used in place of the denatured whey protein/liver, in an amount of 10 to 17 wt % of the reconstituted animal material. The Comparative Example performed poorly in all texture tests, demonstrating the disruption to the chunk texture and the weaker structure of the chunk. Thus, for instance, the hardness of both the fresh and mature chunks of the Comparative Example was much lower than the Reference Example, and outside acceptable quality control limits.

Finally, the chunks of Examples 4 to 12 and the Reference Example were evaluated by a sensory panel of experienced product developers, and scored on the basis of, inter alia, hardness, smell, smell intensity, chunk colour intensity, chunk colour tone, gravy colour and the presence of fines. No clear distinctions between the Reference Example and the products in which liver was replaced with denatured whey proteins was discerned.

The results demonstrate that, unexpectedly, micro-particulate denatured whey protein is an excellent replacement for animal protein in pet food products.

The invention claimed is:

1. A pet food product comprising:
a reconstituted animal material comprising:
an animal protein; and
10-17 wt % micro-particulate denatured whey protein isolate by total weight of the dry matter of the reconstituted animal material, wherein the micro-particulate denatured whey protein isolate has a volume distributed mean particle diameter (D[4,3]) between 37.81 μm and no more than 70 μm, the whey protein isolate contains at least 90 wt % protein, and the total protein content of the reconstituted animal material is 25-36 wt %; and
0.5-10 wt % fiber,
wherein a density of the reconstituted animal material is 0.8-1.2 g/mL.

2. The pet food product of claim 1, wherein the micro-particulate, denatured whey protein isolate and the animal protein form a homogeneous matrix in the pet food product.

3. The pet food product of claim 1, wherein the animal protein does not comprise protein derived from functional organs of an animal.

4. The pet food product of claim 1, wherein said micro-particulate, denatured whey protein isolate contains more than 1 wt % lactose and/or no more than 1 wt % fat.

5. The pet food product of claim 1, wherein the micro-particulate, denatured whey protein isolate has a degree of denaturation of at least about 90%.

6. The pet food product of claim 1, wherein the micro-particulate, denatured whey protein isolate has a volume distributed median particle diameter D(v,50) of from about 10 μm to about 45 μm.

7. The pet food product of claim 1, which is a nutritionally balanced wet pet food product.

8. The pet food product of claim 1, which is a nutritionally balanced dry or semi-moist pet food product.

9. A process for the preparation of the pet food product of claim 1, comprising:
mixing whey protein isolate and water at elevated temperature while applying a shear force, to provide micro-structured, denatured whey protein isolate; and
(i) using incorporating the micro-structured, denatured whey protein isolate as a protein source in the pet food product.

10. The process of claim 9, further comprising cooling the micro-structured, denatured whey protein isolate from step (i) while applying a shear force.

11. The process of claim 9 wherein in step (i), the whey protein isolate and water mixture comprises from about 40 wt % to about 50 wt % water.

12. The process of claim 9, wherein said elevated temperature is a temperature in the range of from about 90° C. to about 120° C.

13. The process of claim 10, wherein the micro-structured, denatured whey protein isolate is cooled to a temperature of no more than about 65° C.

14. The process of claim 10, wherein the cooling and/or application of shear force step(s) are conducted in a scraped surface heat exchanger or an extruder.

15. The process of claim 9, wherein step (ii) comprises preparing reconstituted animal material comprising the micro-structured, denatured whey protein isolate and animal protein, and incorporating said reconstituted animal material into said pet food product.

16. The process of claim 15, wherein the reconstituted animal material is prepared by extrusion at elevated temperatures.

17. The process of claim 16, wherein the reconstituted animal material is prepared by:
   (a) mixing the animal protein source with the micro-structured, denatured whey protein isolate to prepare a slurry, said slurry comprising said animal protein in an amount of from about 50 to about 95 wt % by weight of the slurry;
   (b) subjecting the slurry to conditions of shear to produce an emulsion;
   (c) forming a layer of emulsion;
   (d) heating the layer of emulsion to an internal temperature of at least 70° and
   (e) cutting or shredding the layer into discrete pieces of reconstituted animal material.

18. The process of claim 17, further comprising:
   optionally combining said discrete pieces of reconstituted animal material with a sauce,
   inserting said reconstituted animal material and optional sauce into packaging and sealing and sterilizing the package to provide a packaged wet pet food product.

19. The process of claim 17, wherein said heating of the mixture is conducted by heating from above by bringing steam into direct contact with said mixture and/or from below by applying steam to the underside of a continuous belt carrying said mixture.

* * * * *